United States Patent [19]

Bauer

[11] 3,714,662
[45] Jan. 30, 1973

[54] DEVICE FOR INDICATING AND RECORDING THE SPEED OF TRAVEL AND THE DISTANCE TRAVELLED BY MOTOR VEHICLES

[76] Inventor: Alfons Bauer, Maximiliansstrasse 2, 8230 Bad Reichenhall, Germany

[22] Filed: Dec. 14, 1970

[21] Appl. No.: 97,994

Related U.S. Application Data

[63] Continuation of Ser. No. 735,643, June 10, 1968.

[52] U.S. Cl. .................................................346/18
[51] Int. Cl. ............................................G01d 9/00
[58] Field of Search ...............346/18, 33, 33 SP, 145

[56] References Cited

UNITED STATES PATENTS 2,341,118   2/1944   Rodanet.................................346/18
2,902,332   9/1959   Bauer.....................................346/18

Primary Examiner—Richard B. Wilkinson
Assistant Examiner—John F. Gonzales
Attorney—Fleit, Gipple & Jacobson

[57] ABSTRACT

A device for indicating and recording the speed of a vehicle and its distance of travel, comprising a casing housing having indicating and recording means therein. The indicating and recording means comprise a recording tape roller having a recording tape wound thereon, a transporting cylinder and a winding spool for the recording tape with all of the parts being joined to a block designed as a casset, which can be removably disposed in the casing means. The casing is coupled with transporting means having clock work means for step-wise feed motion of the recording tape and time steps.

10 Claims, 14 Drawing Figures

3,714,662

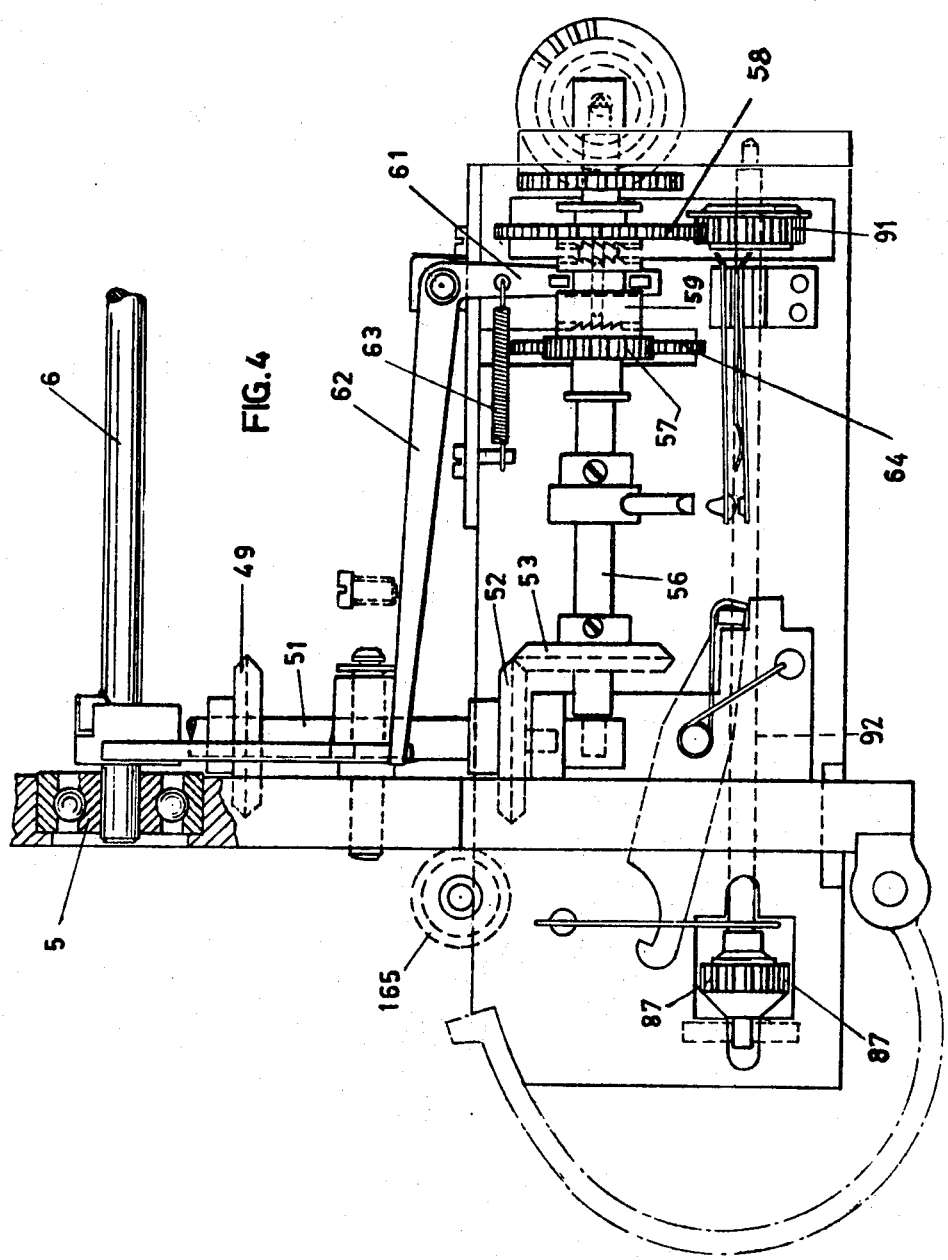

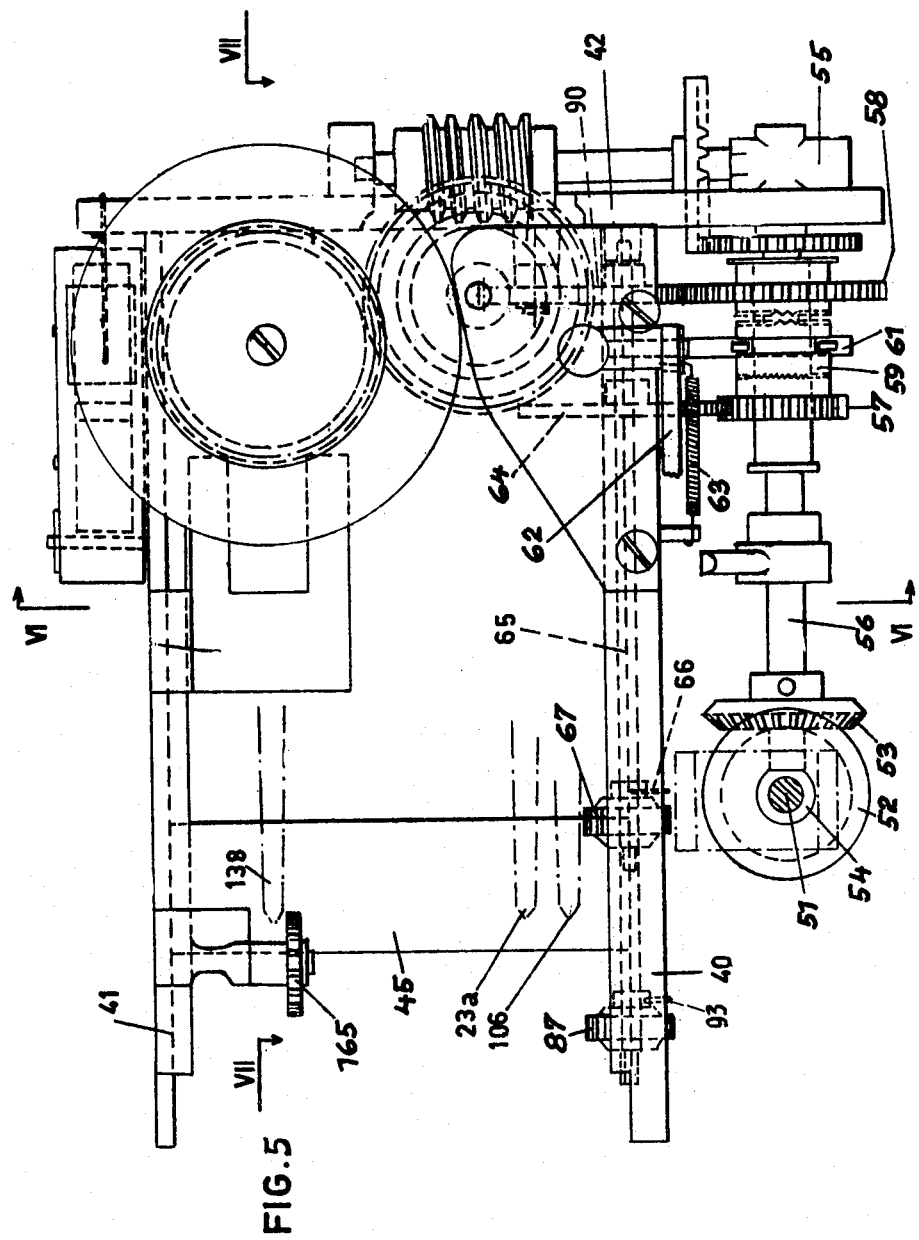

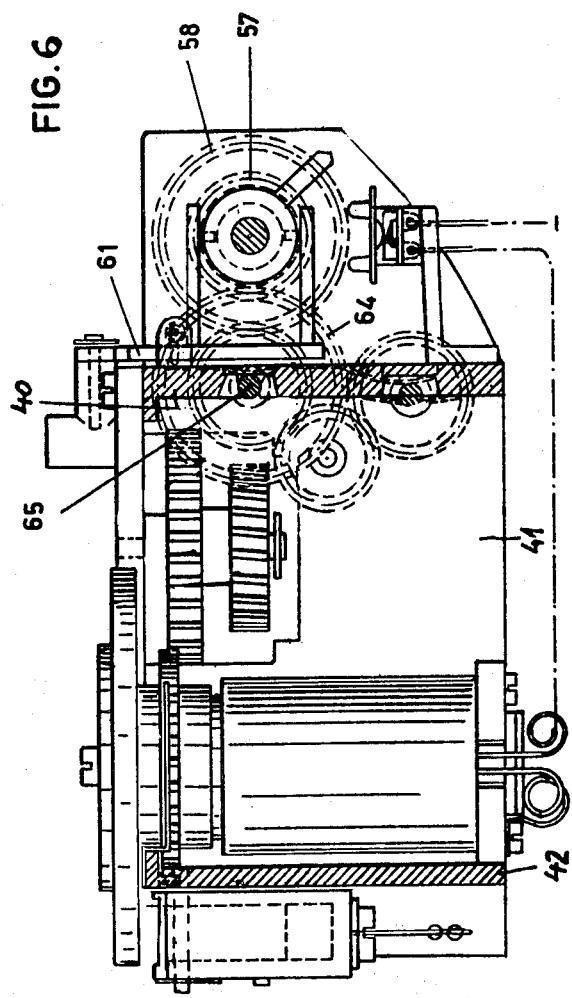

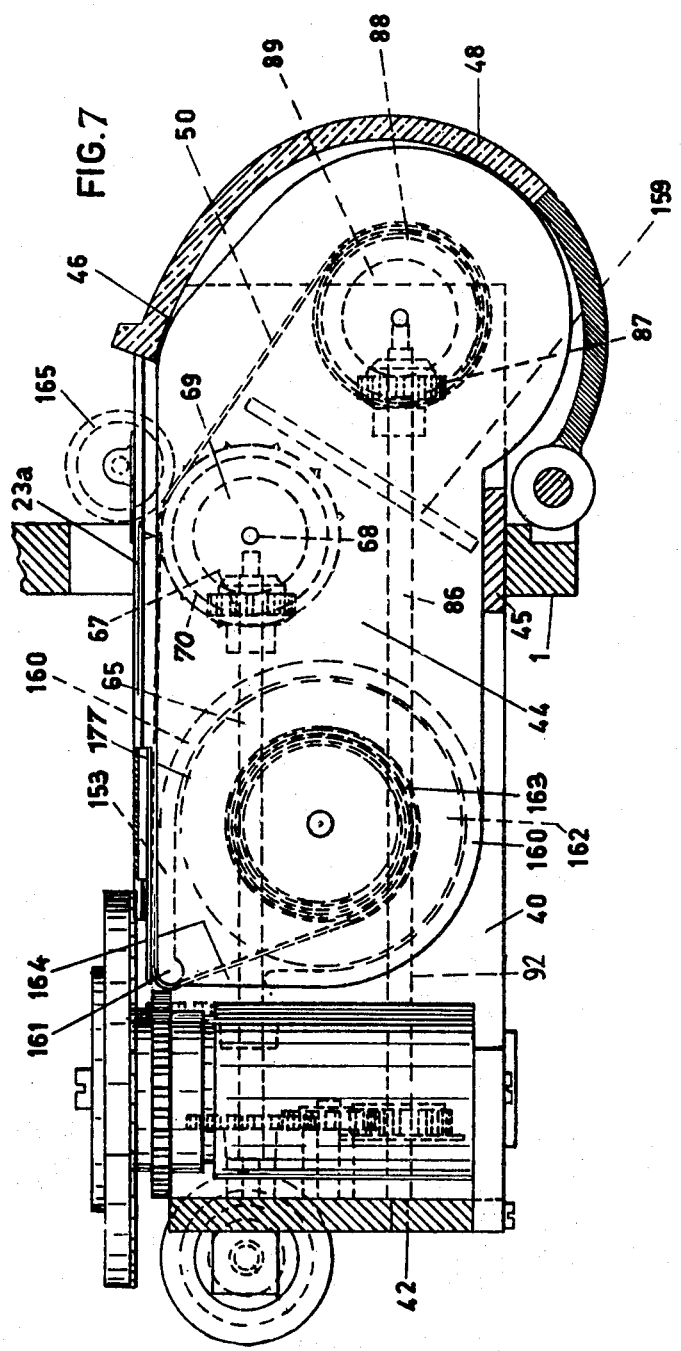

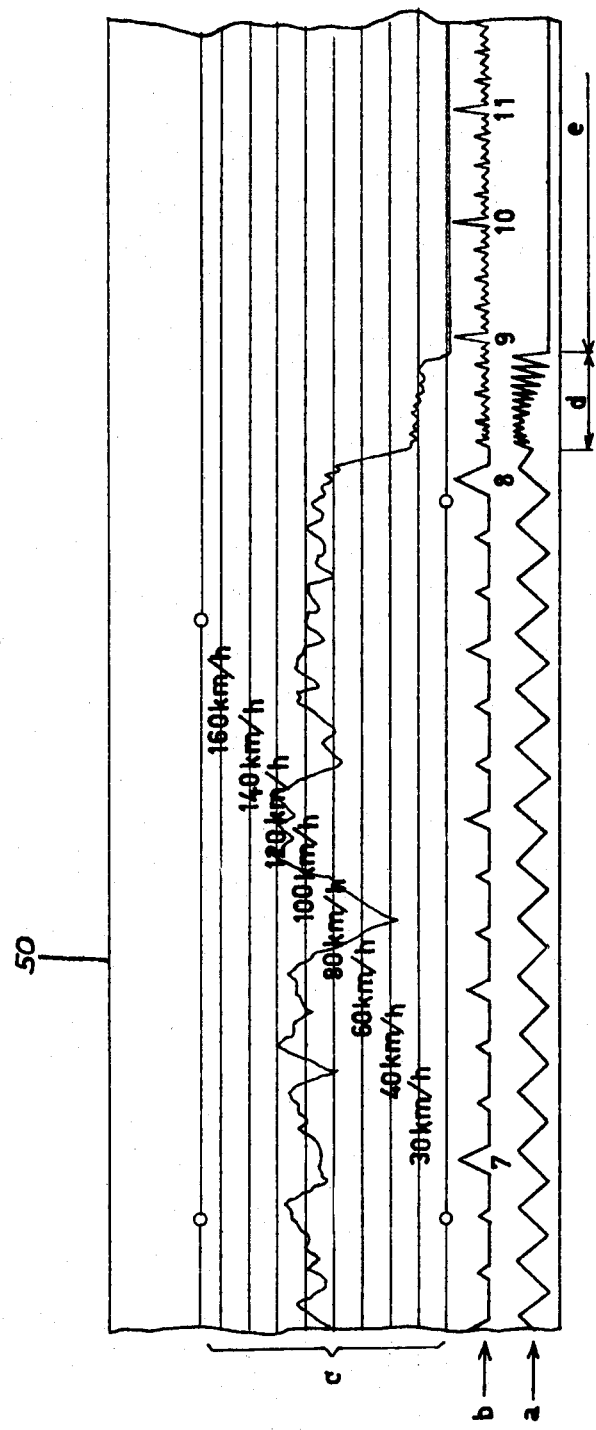

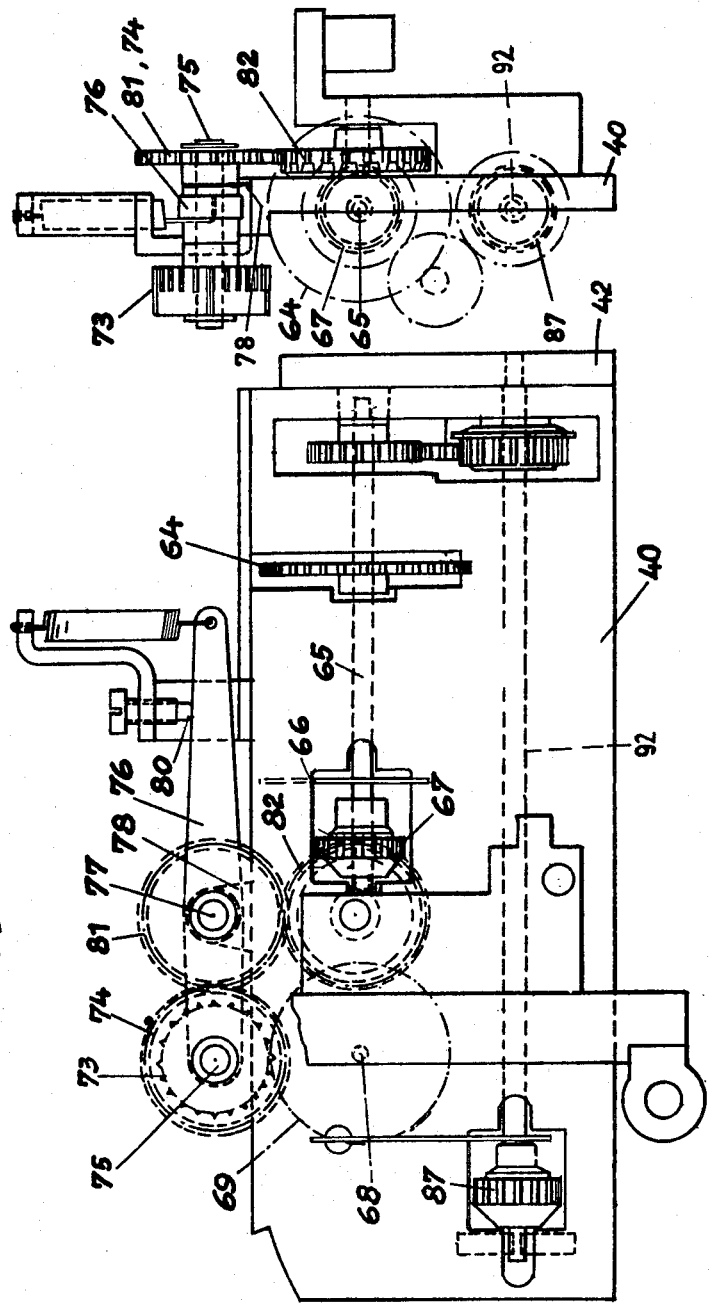

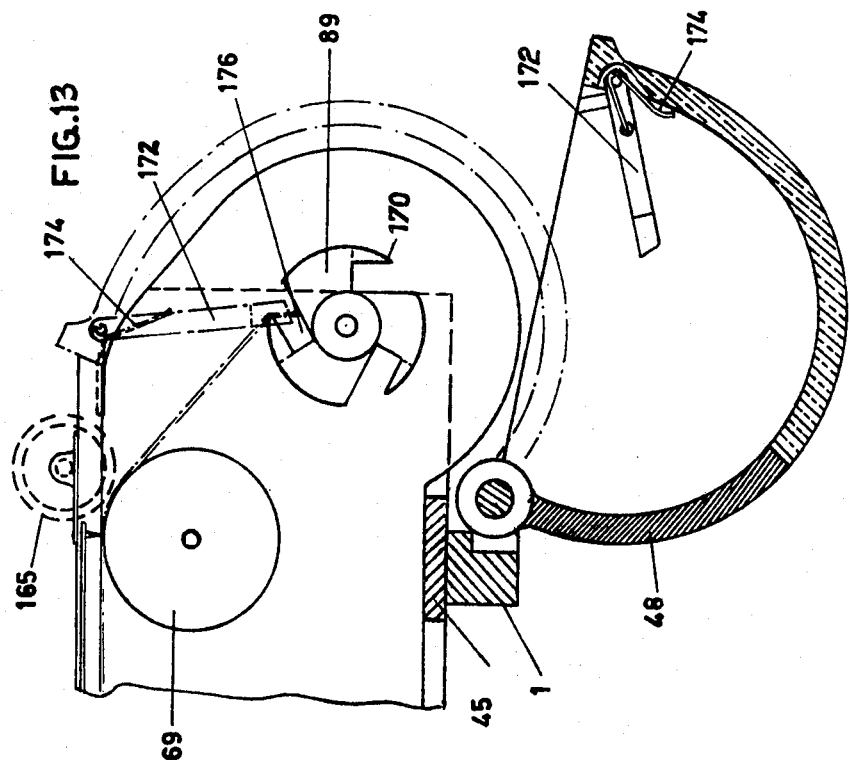
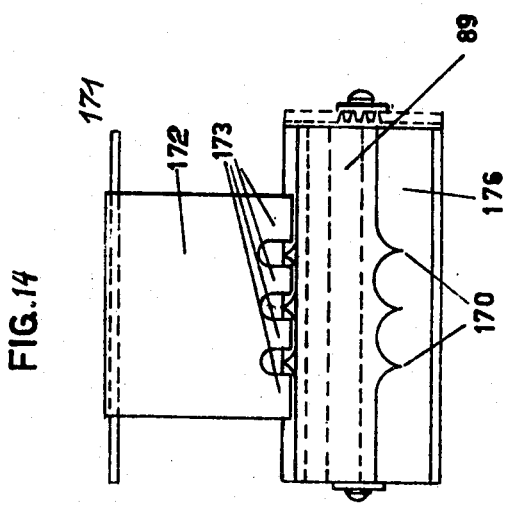

3,714,662

DEVICE FOR INDICATING AND RECORDING THE SPEED OF TRAVEL AND THE DISTANCE TRAVELLED BY MOTOR VEHICLES

This application is a continuation of U. S. application Ser. No. 735,643, filed June 10, 1968.

The invention relates to a device for indicating and recording the speed of travel and the distance traveled by motor vehicles. It generally comprises a transporting cylinder and a winding spool disposed in a casing compartment of the indicating device and coupled with a transporting device having a clockwork for feed motion of a recording tape on a roller in time steps.

In devices for recording vehicle traveling speeds, it is known to record upon a recording tape the time in a separated recording field in the shape of a zigzag line with printed time figures. In other known recording devices, the spring motor of the clockwork for the drive of the recording tape is wound up at a higher travel speed dependent from the indicating system and thereby held on complete tension, and a device must be provided for avoiding the dangerous excess tension. In still other travel control devices for motor vehicles, the additional recording device is visibly built in the casing and is provided with an endless recording tape carrier and a canceling device which can be actuated only in the removed and open state of the inserted casing.

All known recording tape devices require improvements, in relation of a quick and exact changeability of the recording tape without sources of error.

In using the invention the prior known recording devices are improved by a recording device of the above-mentioned type, in which the recording tape roll, the transporting cylinder and the winding spool are designed as a cassette removably disposed in the casing in obligatory connection with the transporting cylinder and the winding spool.

BRIEF DESCRIPTION OF THE DRAWINGS

Further details and advantages of the invention are illustrated in the specification in connection with the drawings, in which:

FIG. 4 is an enlarged partial side view of the indicating means.

FIG. 5 shows a plan view of the changeable cassette casing.

FIG. 6 is a cross-sectional view of FIG. 5 taken along lines VI—VI.

FIG. 7 is a longitudinal section view of FIG. 5 taken along lines VII—VII.

FIG. 8 is a portion of the recording tape used in the invention.

FIG. 9 is a side view showing an embodiment of the drive for the recording tape.

FIG. 10 is a front view of FIG. 9.

FIG. 13 is an enlarged side view of part of the cassette casing showing the tear-off means for the recording tape at the mouth of the casing part and the windup spool with the teeth for gripping the tape end.

FIG. 14 is an enlarged front view of the windup spool.

DETAILED DESCRIPTION OF THE DRAWINGS

Figure 1:
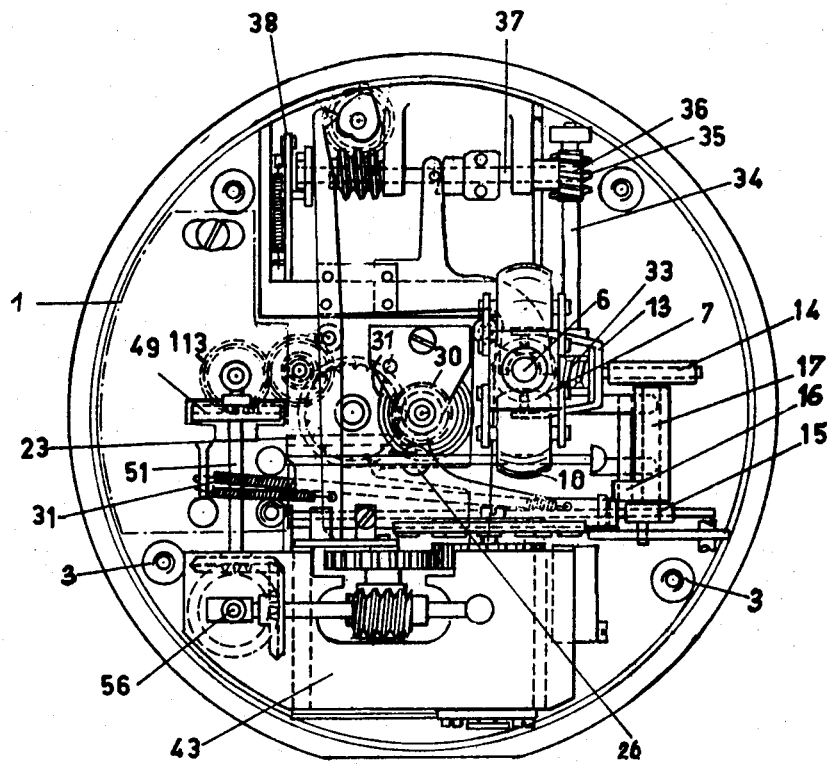
FIG. 1 discloses a rear elevation view of the indicating means with backplate removed.
Figure 2:
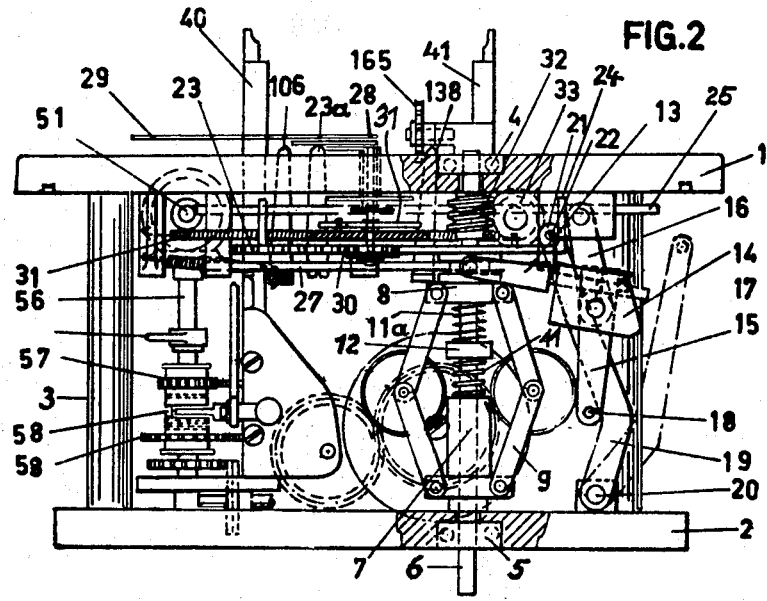
FIG. 2 shows a plan view partially in section of FIG. 1.
Figure 3:
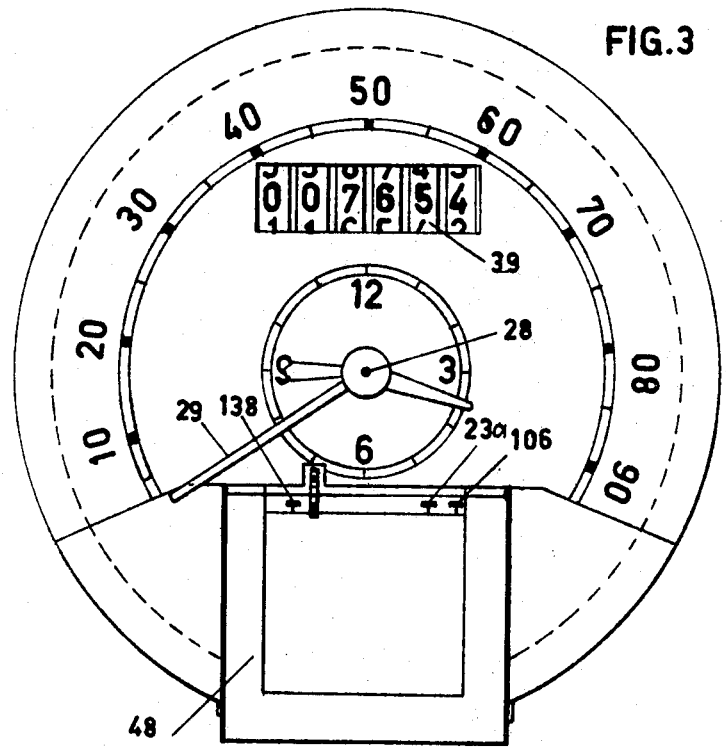
FIG. 3 shows a front elevation view of the indicating means.

The indicating device in FIGS. 1 and 2 has two casing plates 1 and 2, which are rigidly connected by spacer bolts 3 with each other to form a casing. A drive shaft 6 is rotatably disposed in ball bearings 4 and 5 of the two casing plates 1 and 2 and the shaft end projecting from the rear plate 2 is rotatably coupled in a known manner with a vehicle wheel by a flexible shaft which is not shown. Upon the driving shaft 6 is disposed a centrifugal pendulum 7, which is movably connected with a movable control member 8 by governors 9. Two springs 11 and 11 a are biased upon a collar 12 of the drive shaft 6 in such a manner that the movable control member 8 of the centrifugal pendulum 7 is spring biased in the null position which is shown in FIG. 2. This control member 8 has a ball bearing in the outer traveling bear ring and engages two studs of a fork 13, which transfers the movement of the control member 8 to a linkage system. The linkage system comprises levers 14 through 19 with the last lever 19 being rockable about an axle 20 and with its other end 21 engaging a catch pin 22 to move a rack 23, which contacts three points with its ends. A bent guide flap 24 rests upon a stationary guide rod 25 and an eye 26 supports a second guide rod 27. The rack 23 is longitudinally shiftably disposed and engages its teeth in a gear wheel 30 or gear fixed on the shaft 28 of the pointer which is adapted to indicate speed. The rack 23 is grasped by the catch pin 22 of the lever 19 at the guide flap 24 and is thrown to the right by influence of a spring 31 a. Additionally, the pointer shaft 28 is attached to one end of the spiral spring 31 which spring biases the gear wheel 30 and the pointer 29 in their initial positions. The gear wheel 30 of the pointer shaft 28 is moved by the rack 23 and in turn moves the pointer 29 on a scale which indicates the speed of the vehicle, as is shown in FIG. 3. When the speed decreases, the control member 8 of the centrifugal pendulum 7 returns by the influence of the springs 11 and 11 a to its initial position and the rack 23 is returned to its initial position by the influence of the spiral spring 31 causing pointer 29 to return to its initial position. The movement of the rack 23 is recorded by the writing arm 23 a fixed to the rack on the recording tape.

The indicating means also contains a distance counting means which is driven by the driving shaft 6 by means of a worm gear 32, 33 turning shaft 34 which drives worm gear 35, 36 to rotate the shaft 37. At one end of the shaft is disposed a switch gear 38 which drives a switch mechanism 39 at predetermined intervals, as for example each 100m, in a travel distance to move the figure roll by the smallest adjustable value.

These elements of the indicating device form the basis for registering the travel speed and the travel distance in line shaped design and in figures by employment of a non-perforated recording tape with the time indications also being noted in a special changeable cassette.

For this purpose, in the lower half of the front plate 1, as shown in FIGS. 3 and 6, a rectangular recess is provided, through which two longitudinal walls pass, are spaced from the rear plate 2 and are connected with each other by a transverse wall 42 to form the casing part 43 for the registering device and its changeable cassette. Near the front casing plate 1 the casing part 43 contains a plank or rim 45, as shown in FIG. 5, connecting the two longitudinal walls 40, 41 with each other and by means of which they may be fastened at the front casing plate 1, as shown in FIG. 7. The two longitudinal walls extend through the front plate 1 and form with their curve-shaped front edges 46 an abutment for a cape 48 made of transparent artificial material which can be pivoted about the lower end of the front plate 1 by a horizontal hinge. The casing part 43 has not only the purpose to receive the changeable cassette in its interior but also carries the device to supply the feed motion of the recording tape 50 and the means for the time marking on the recording tape.

The means for supplying the feed motion of the recording tape 50 is driven by a clockwork, which is known and is only represented circular dashed lines 113. In FIG. 1 only gear wheel 49 is represented. This wheel is continuously engaged with the drive wheel of the clockwork and transfers by means of the shaft 51 the torque to the pair of bevel gears 52, 53, as is shown in FIG. 4. The bevel gear 53 is fixed on a shaft 56 which is rotatably disposed in bearings 54, 55, as is shown in FIG. 5, at a distance from the outer surface of the casing part wall 40 and parallel thereto to drive a changeover gear and rotate it once every hour. This changeover gear serves to supply the feed motion of the recording tape as well as indicating the traveling time and stopping time of the vehicle. The gearing contains a small change wheel 57 for the slow feed motion of the tape and a large change wheel 58 for the quick feed motion of the recording tape. Both change wheels 57, 58 are disposed loosely on the shaft 56 and have toothed hub surfaces facing each other. Between the two change wheels 57, 58 there is axially shiftably disposed on the shaft 56 a coupling sleeve 59 coupled by a longitudinal wedge with the shaft 56.

The coupling sleeve 59 may be brought in rotating engagement against the hub of the small change wheel 57 or with the hub of the larger change wheel 58 by rockable angular levers 61 and 62. A spring 63 acts upon one end of the lever arm 61 such that the sleeve 59 is spring biased in contact with the small change wheel 57 for switching the changeover gear at first upon the slow feed motion speed of the recording tape. The change wheel 57 engages a large gear wheel 64 which extends through a recess of the casing part wall 40 and is fixed on a shaft 65 which is freely rotatably disposed in a longitudinal nut in the casing part wall 40. The shaft 65 is yieldably disposed with its rearward end in a bore of the casing part wall 40 and its front end between springs 66 and carrying a pinion 67 disposed in a wall recess, as shown in FIG. 7. Engaging the pinion 67 is a gear wheel 70 which is fixed on the shaft 68 of the transporting cylinder 69 and which transfers the slow rotating motion to the recording tape 50. The change wheel 58 engages a gear wheel 90 which extends through a recess in the casing part wall 40 and is fixed on shaft 65. Change wheel 58 also engages gear wheel 91 which is fixed on shaft 92 (FIG. 4) and which drives pinion 87. Shaft 92 is yieldably disposed with its rearward end in a bore of the casing part wall 40 and its front end between springs 93. Pinion 87 is disposed in a wall recess as shown in FIG. 4. Engaging pinion 87 is gear wheel 88 which rotates winding spool 89. Accordingly, transporting cylinder 69 and winding spool 89 are in mechanical connection and are both moved at the same time.

The transporting cylinder 69 bears with its shaft not directly in the casing part 43, but in the changeable cassette 44, which contains for the gear wheel 70 a recess 166 of a special kind which allows engagement between the gear wheel 70 and the pinion 67.

The transporting cylinder 69 may be provided with an annular surface having spikes 71 spaced in the circumferential direction which during feeding of the recording tape 50 enter the paper and make recordings which serve as time markings. The spacing of the spikes 71 from each other may be selected in such a manner that the distance between consecutive spikes represents a time space of 5 minutes, for example, which is marked on the recording tape 50.

In another embodiment, as shown by FIGS. 9 and 10, it is possible to drive a spike wheel 73 by the changeover gear, which engages the recording tape at the circumference of the transporting cylinder 69 and advances the recording tape exactly. This spike wheel 73 is disposed on the same shaft 75 with a gear wheel 74 and is freely rockably disposed about a shaft stud 77 which is parallel to the transporting cylinder axis in a plane parallel to the plane of the recording tape.

The shaft stud 77 is fixed to a bearing flap 78 projecting from the casing part wall 40. The lever 76 under the influence of a spring encounters an adjustable stationary abutment 80, which controls the engagement position of the spike wheel 73 and the entering of the spikes into the paper of the recording tape 50. The gear wheel 74 is aligned to engage the gear wheel 81 which is of same size and which is rotatable about the shaft stud of the lever 76 to engage gear wheel 82 which also has crown teeth which engage the pinion 67 already described. According to this embodiment, the transporting cylinder 69 acts as a counterpress roll for the spike wheel 73 and as a writing foundation for the recording tape 50, which is recorded on by the writing points of several writing arms. The spike wheel 73 may be designed in such a manner that every five minutes a short spike and each quarter or full hour a long spike is pressed into the recording tape 50.

The changeable cassette 44 is provided with a casing of transparent artificial material. The side walls of the cassette have no connection in the range of the winding spool 89, but are held spaced from each other and supported by a transverse wall 159. The rearward part of the changeable cassette 44 is provided with a hollow cylindrical cover 160 with a flap 161 acting as a guiding edge for the recording tape 50. A cover connects the two lateral walls and forms a hollow space 162 for the roller 163.

Figure 11:
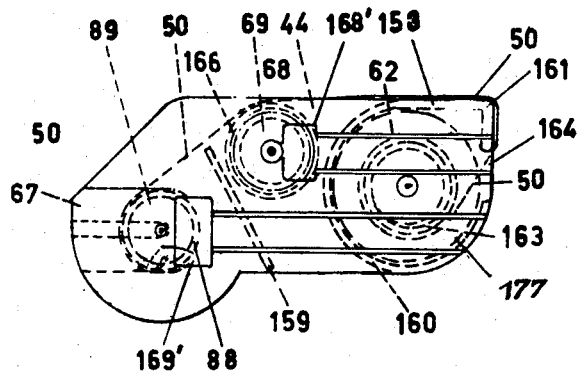
FIG. 11 is a side view of the changeable cassette used in the invention.
Figure 12:
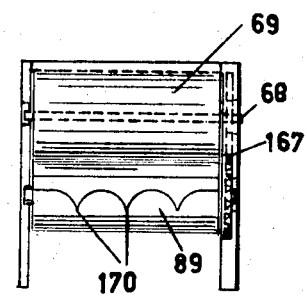
FIG. 12 is a front view of FIG. 11.

From this roller 163 the recording tape 50 runs through a slot or opening 164 in the rearward casing wall, around the guiding edge 161 across the print foundation 153 and the transporting cylinder 69 to the winding spool 89. A hollow space 162 is made accessible by an opening in the lateral wall, which may be closed by a cover 177 after insertion of a roller 163. It is advantageous to dispose in the rear of the transporting cylinder 69 a counterpressing roller 165 elastically supported at the lateral wall of the changeable cassette 44, which may be toothed and which holds the recording tape 50 down. The inside of the cassette wall defines hollow spaces 166, 167 for the gear wheels 70, 88 of the transporting cylinder 69 and the winding spool 89. As shown in FIG. 11, in the outer surface of the wall grooves are provided which end in rectangular recesses 168', 169' which allow engagement of the gear wheels 67, 70 and 87, 88 and the easy insertion of the changeable cassette 44 into the casing part 43.

Each winding spool 89 has at least one set of back cut teeth 170 having sharp points which are directed in the direction the recording tape is wound up for attachment to the end of the recording tape 50. Three sets are contemplated in the present invention. For the automatic windings up of the recording tape, pivotable cape 48 is provided with a rockable flap 172 attached to axle 171. Flap 172 is made of glass or other clear artificial material and is provided with teeth 173 at its lower transverse edge, the teeth of which pass between the teeth 170 of the winding spool 89 and press the recording tape 50 under the influence of a spring 174 against the teeth 170 of the winding spool 89. The end of the recording tape after being cut by the tear-off means for the recording tape 50 by a knife at the mouth of the casing part is directed to the winding spool 89 and presses against the catch flap 172 and then against the circumference of the winding spool 89. Then the tape end passes into one of the recesses 176 formed by the back cut teeth 170 and is pressed by the catch flap 172 against the teeth 170 of the winding spool 89 which by virtue of the spring force of the catch flap pierce the tape end. In further rotation of the winding spool 89 the catch flap 172 is forced aside and the tape is secured and advanced by the tape by the teeth 170 of the winding spool 89.

All recordings made by the writing pins 106, 23a, and 138 on a part of the recording tape 50 as shown in FIG. 8 are visible since the cape 48 is transparent.

What is claimed is:

1. A device for indicating and recording the speed of a vehicle and the distance which it travels, comprising in combination, a casing housing, said casing housing containing indicating and recording means, said indicating and recording means comprising a block, a recording tape roller connected to said block, a recording tape wound on said roller, a transporting cylinder to move said recording tape connected to said block, and a winding spool to hold said recording tape connected to said block, said indicating and recording means being designed as a cassette which can be removably disposed in said casing housing and coupled with transporting means, said transporting means comprising clockwork means for step-wise feed motion of said recording tape in time steps, and including a transporting cylinder and a winding spool, and means for connecting said transporting cylinder and said winding spool such that said transporting cylinder and winding spool are both moved at the same time.

2. An indicating and recording device as claimed in claim 1 including a change-over gear spaced from the wall of said changeable cassette and parallel thereto, said change-over gear including two change wheels being alternately engaged with a gear wheel of said transport cylinder and a gear wheel of said winding spool and being yieldably disposed in a recess defined by said casing to allow disengagement of the gear wheels of said transport cylinder and said winding spool during insertion or removal of said changeable cassette.

3. An indicating and recording device as claimed in claim 2, including means to allow disengagement to occur when a predetermined amount of resistance occurs during winding up of said recording tape.

4. Indicating and recording device as claimed in claim 1, wherein said changeable cassette includes a substantially closed casing defining a slot for the passing of said recording tape and a turn guide edge for said recording tape to be guided to the transporting cyliner and a winding spool connected to said casing which receives recording tape from said transporting cylinder said winding spool having a shaft and gear wheel slidably disposed in parallel grooves extending to the front side allowing removal of said winding spool.

5. An indicating and recording device as claimed in claim 1 in which the transporting means includes means disposed in said case housing for engaging the recording tape at the circumference of the transporting cylinder and advancing the recording tape.

6. An indicating and recording device as claimed in claim 5 in which the means for engaging the recording tape at the circumference of the transporting cylinder comprises a spiked wheel which is moveable into and out of engagement with the recording tape.

7. An indicating and recording device as claimed in claim 1 in which the transporting cylinder has means for making recordings on the recording tape.

8. An indicating and recording device as claimed in claim 7 in which the means for making recordings on the recording tape comprises spikes which enter the recording tape when the recording tape is fed through the cassette.

9. An indicating and recording device as claimed in claim 2 including lever means for operating the changeover gear.

10. An indicating and recording device as claimed in claim 2 including spring means for yieldably disposing the two change wheels in a recess defined by said casing.

* * * * *